United States Patent
Weinstein

[15] 3,664,189
[45] May 23, 1972

[54] BOAT SPEEDOMETERS

[72] Inventor: Albert Weinstein, Alexandria, Va.

[73] Assignee: Wellington Products, Inc., Alexandria, Va.

[22] Filed: July 14, 1970

[21] Appl. No.: 54,773

[52] U.S. Cl. ............................................................73/185
[51] Int. Cl. .......................................................G01c 21/00
[58] Field of Search .............................................73/185, 189

[56] References Cited

UNITED STATES PATENTS 2,081,557    5/1937    Pierce et al. ..............................73/185

*Primary Examiner*—Donald O. Woodiel
*Attorney*—Jerry B. Cesak

[57] ABSTRACT

An elongated support is either mounted or hand-held on a small boat so as to slant downwardly from the hull toward the water. A speedometer head at the upper end of the support is driven by a shaft rotatably journalled on the support. The free lower end portion of the shaft extends beyond the lower end of the support into the water and carries an impeller which is rotated by movement of the boat through water. The shaft is normally straight but its lower end portion is resiliently flexible in all directions so that the axis of rotation of the impeller is aligned with the water slipstream and drag is materially reduced.

6 Claims, 3 Drawing Figures

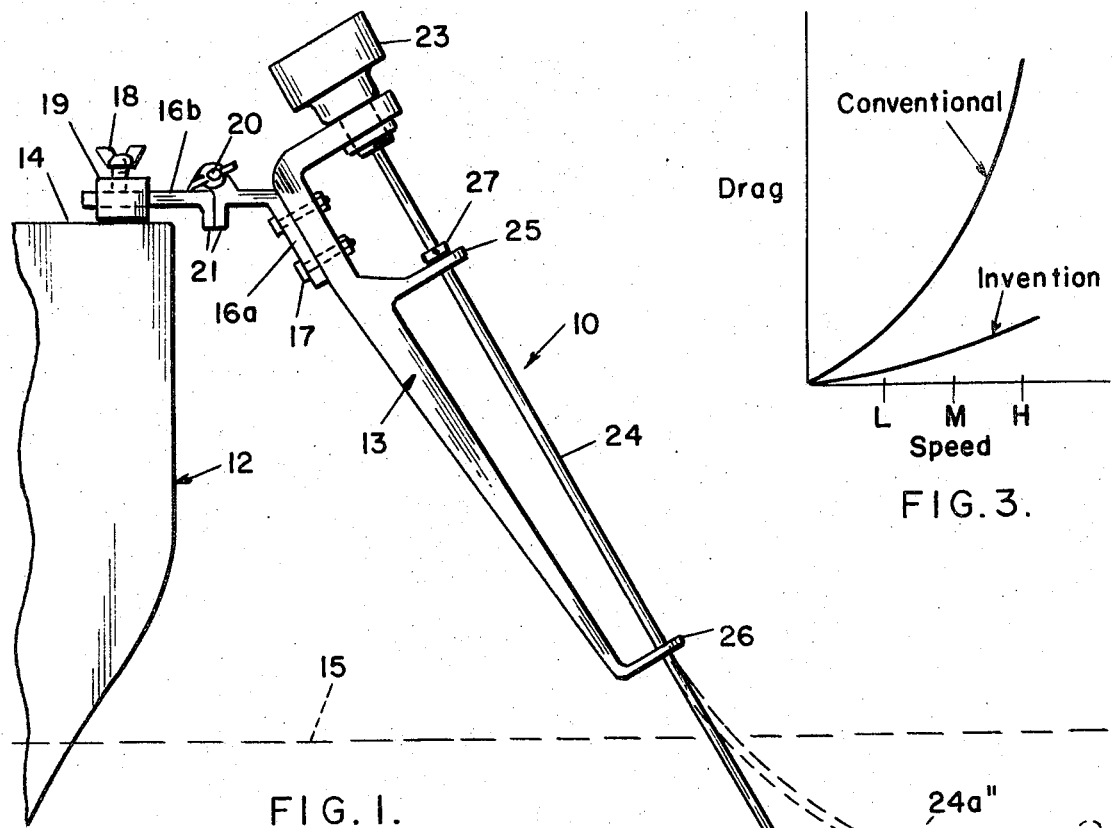
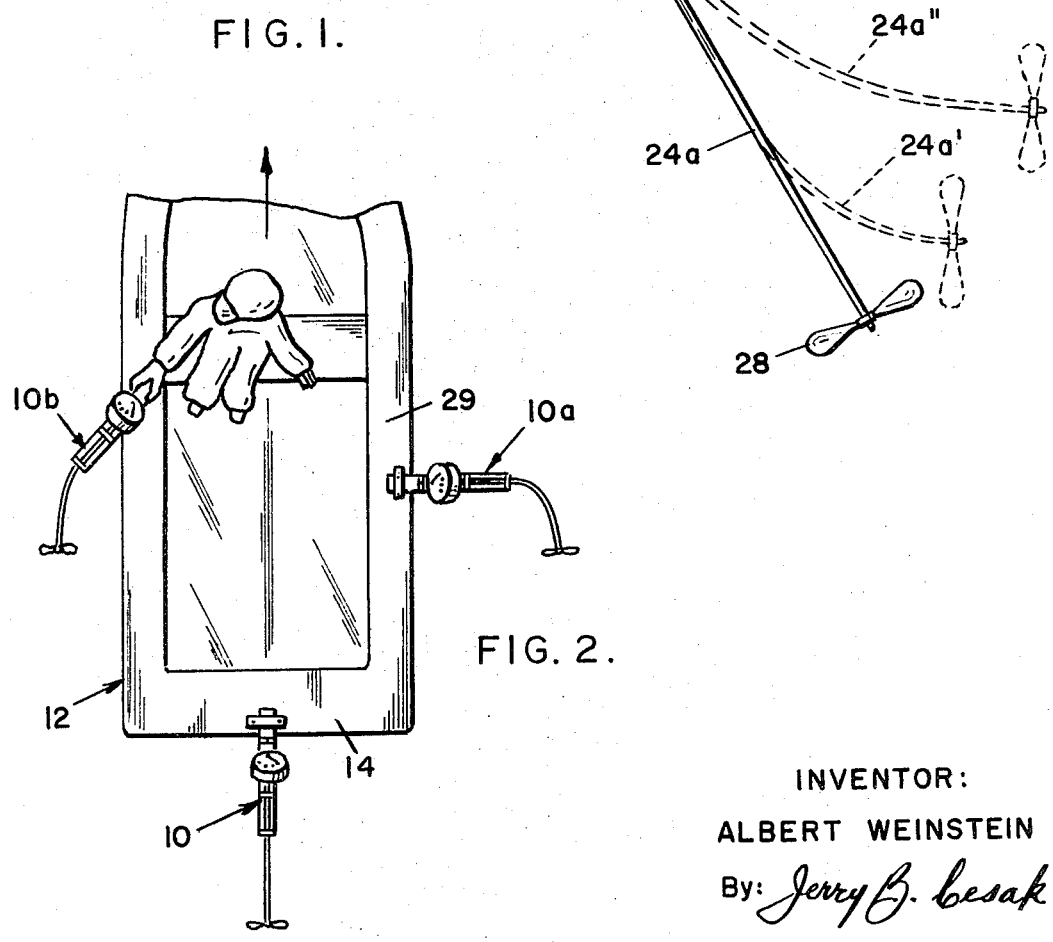
FIG. 1.
FIG. 3.
FIG. 2.
INVENTOR:
ALBERT WEINSTEIN
By: *Jerry B. Cesak*

BOAT SPEEDOMETERS

This invention relates to new and useful improvements in ship's log instruments, and in particular the invention concerns itself with speedometers and, incidentally, odometers, for measuring the speed attained and the distance traveled by small boats, particularly small sailboats and low-powered motor boats having a cruising speed of somewhere between zero and about 10 or 15 knots.

Conventional methods of ship speed measurement include the very old but somewhat inefficient practice of paying out a knotted line off the stern of the ship into water, and manually counting the number of knots on the line paid out during a given period of time.

Another, more recent speed measuring technique is that of measuring the drag created by pulling a small object through water, the theory being that the amount of drag is a function of speed. However, as a practical matter, the drag is not a linear function of speed, and thus this technique of measurement is not reliable, particularly at very low speeds.

Another conventional speed measuring device utilizes an impeller towed at the end of a long line, movement of the impeller through water causing it to rotate and the speed of its rotation being used to determine the speed of the boat. In order to prevent the impeller from surfacing or broaching out of water, the towing line must be quite long and this poses problems when other boats are nearby, such as in racing or in docking, when the long line may interfere with the other boats and possibly be cut by them. Efforts to avoid this difficulty have produced a shorter line with weights added to the propeller to prevent surfacing. While this is quite satisfactory at high speeds, it is wholly ineffective at low speeds since the weights cause the propeller to sink to the bottom and the device becomes inoperative.

Still another conventional device is a pitot tube placed in the water at a given level so that kinetic pressure of water causes the water level in the tube to rise to a point where the kinetic pressure is balanced by statice pressure. If the pitot tube is hand-held, the use thereof is very awkward, especially if the boat is rolling or pitching. On the other hand, if the pitot tube is mounted at the side or below the hull and is connected to an indicating device such as a Bourdon gage inside the boat, it is necessary to provide a hole in the hull below the waterline and this is generally objectionable from the standpoint of possible leakage. Moreover, the arrangement is unduly complicated and expensive so that it does not appeal to owners of small boats.

The principal object of the invention is to avoid the above outlined disadvantages of conventional speed measuring devices by providing a very simple, inexpensive speedometer which is particularly suitable for use on small boats and is capable of accurately measuring speed, especially in the low speed range, and up to about 10 or 15 knots.

An important feature of the invention is that it may be quickly and easily installed on or removed from the boat without requiring drilling of holes below the waterline. Moreover, it may be simply hand-held, without any installation at all.

Another important feature is that the invention has a very small drag in water as compared to conventional devices, low drag being especially important for sailboats.

With the foregoing more important object and features in view and such other objects and features which may become apparent as this specification proceeds, the invention will be understood from the following description taken in conjunction with the accompanying drawings, wherein like characters of reference designate like parts, and wherein:

FIG. 1 is a side elevational view of the speedometer of the invention mounted at the stern of a boat;

FIG. 2 is a fragmentary plan view on a reduced scale, showing speedometers at various possible locations on the boat; and FIG. 3 is a diagram of drag comparison.

Referring now to the accompanying drawings in detail, particularly to FIG. 1, the speedometer of the invention is designated generally by the reference numeral 10 and is especially intended for use on a small boat 12, such as a sailboat of a length up to 20 or 25 feet, although it will be understood that it may also be used on low-powered motor boats which cruise at speeds up to 10 or 15 knots. The simple construction and low cost of the speedometer make it well acceptable to owners of these types of craft.

The speedometer 10 comprises an elongated rigid support 13, which in FIG. 1 and in the lower portion of FIG. 2 is shown as being mounted on the stern 14 of the boat 12 so that it extends in a downwardly slanting position toward the water, the waterline being indicated at 15 in FIG. 1. The mounting of the device on the boat may be accomplished in any suitable manner, as for example by a hinge having one leaf 16a secured to the support 13 by bolts 17, while its other leaf 16b is removably clamped by a screw 18 in a slotted mounting block 19 on the stern 14. The hinge axis is constituted by a clamp screw 20 which, when loosened, permits the support 13 to be swung upwardly to an inoperative position. The hinge leaves 16a, 16b are preferably provided with extensions 21 which come into supporting abutment with each other when the support 13 is in its lowered, operative position.

The upper end of the support 13 includes an integral mounting bracket 22 for a speedometer head 23 of any suitable conventional type, and as is common in the art, the head 23 may have an odometer in addition to a speed indicator, so as to measure both the distance traveled and the speed. The head 23 is driven by a shaft 24 which is rotatably journalled in bearings 25, 26 provided intermediate the ends and at the lower end, respectively, of the support 13, as will be readily apparent. A thrust collar 27 may be secured to the shaft 24 to engage the top of the bearing 25.

The lower end portion of the shaft 24, specifically designated as 24a, extends beyond the lower end of the support 13 and a suitable impeller or propeller 28 is secured to the terminal end of the shaft portion 24a. The shaft 24, including its lower end portion 24a, is normally straight, but is formed from resiliently flexible material so that its free lower end portion 24a is capable of bending in any direction. This bending characteristic may be enhanced by making the shaft portion 24a longitudinally tapered in the direction of the impeller 28, as shown.

When the device is mounted on the boat and the boat is not in motion, the shaft portion 24a is straight and extends into the water as shown by full lines in FIG. 1. However, as soon as the boat commences to move forwardly, the resiliently flexible shaft portion 24a is bent rearwardly in parallel with the direction of travel and the axis of rotation of the impeller 28 thus becomes automatically aligned with what may be referred to as the slipstream resulting from movement of the impeller through the water, it being understood that even in the bent condition of the shaft, the impeller still remains submerged.

As the slipstream causes the impeller 28 to rotate, its rotation is transmitted through the shaft portion 24a which continuously flexes and universally transmits rotation to the main portion of the shaft 24 held by the bearings 25, 26, thus driving the speedometer head 23 in substantially direct proportion to the speed of the boat in water. The longitudinally tapered form of the shaft portion 24a results in inherently greater flexibility as the shaft cross-section diminishes and therefore offers less resistance to bending. Thus at low speeds the drag of water against the impeller 28 may cause only the region of the shaft immediately adjacent the impeller to bend, as indicated by the dotted lines 24a', while at medium speeds a greater length of the shaft will bend until at high speed the full length of the shaft portion 24a up to the bearing 26 may bend, as shown by the dotted lines 24a''. However, in all instances the axis of rotation of the impeller 28 will align itself with the water slipstream, thus assuring accurate speed measurement throughout the speed range and particularly at low speeds where conventional boat speedometers are poorly effective.

To reduce the drag and assist in bending of the shaft portion 24a into alignment with the slipstream, the shaft 24 is supported by the support 13 at an angle of less than 90° from the waterline 15, such as at an angle of approximately 60° as shown in the drawings. The small amount of drag assures efficient operation of the boat and accurate operation of the speedometer throughout the speed range, as will be apparent from FIG. 3 which diagramatically shows a drag comparison of the invention and of conventional devices at low, medium and high speeds. Especially at high speeds, the invention results in a modest increase in drag, compared to conventional devices, thus allowing the boat to move at greater speeds.

By virtue of the flexible shaft portion 24a which bends in all directions, the device may be mounted on the boat 12 at any suitable location. As shown in FIG. 1 and in the lower portion of FIG. 2, the device is mounted on the stern 14. However, it may also be mounted on the gunwale 29 to extend laterally overboard as indicated at 10a in the right-hand portion of FIG. 2, and the flexible shaft portion will still align itself with the water slipstream. Also, the device need not be attached to the boat at all and may be simply hand-held by an occupant of the boat as indicated at 10b, this being particularly suitable when speed measurement is to be taken only at intervals. If the device is mounted on the boat, it may be easily raised out of the water by loosening the hinge clamp screw 20 and swinging the support 13 upwardly. This may be done when speed measurement is not desired, or when traveling through very shallow water, or when it is necessary to remove seaweed from the impeller 28. Of course, by loosening the clamp screw 18, the entire device may be removed from the boat for convenient storage.

While in the foregoing there has been described and shown the preferred embodiment of the invention, various modifications and equivalents may be resorted to within the spirit and scope of the invention as claimed.

What is claimed as new is:

1. A boat speedometer comprising an elongated support adapted to extend downwardly from a boat hull toward the water, a speedometer head provided at the upper end of said support, a shaft rotatably journalled on and extending alongside the support with the upper end of the shaft being operatively connected to said head, said shaft including a lower end portion extending freely beyond the lower end of the support for immersion in water, and an impeller secured to the lower end of said shaft, said shaft being normally straight but said lower end portion thereof being resiliently flexible in all directions and thereby capable of universal bending to place the axis of rotation of said impeller in substantial alignment with the water slipstream.

2. The device as defined in claim 1 wherein said flexible lower end portion of said shaft is longitudinally tapered in the direction of said impeller.

3. The device as defined in claim 1 wherein said support includes longtudinally spaced bearings, one of said bearings being provided at the lower end of the support and having said shaft rotatably journalled therein.

4. The device as defined in claim 1 which is further characterized in that said support is adapted to be hand-held in an overboard position by an occupant of the boat.

5. The device as defined in claim 1 together with means for mounting said support on the hull of a boat.

6. The device as defined in claim 5 wherein said mounting means include a hinge with a horizontal pivot for swinging said support from its downward position to a raised inoperative position.

* * * * *